INVENTOR.
WALTER L. GRABOWSKI
LAWRENCE F. HERTE
BY John L. Jackson
ATTORNEY

United States Patent Office

3,248,104
Patented Apr. 26, 1966

1

3,248,104
CONTACT PRINTING TRANSPORT
Walter L. Grabowski, San Jose, and Lawrence F. Herte, Palo Alto, Calif., assignors to International Business Machines Corporation, New York, N.Y., a corporation of New York
Filed Dec. 27, 1963, Ser. No. 333,971
3 Claims. (Cl. 270—58)

This invention relates to transport mechanisms in general and more particularly to a transport mechanism for bringing two members positioned at remote locations into intimate contact with each other without relative movement therebetween during contact.

One of the problems encountered in recently developed image storage and retrieval systems is that of image degradation. In the typical system a document to be stored and selectively retrieved upon demand is first photographed by means of a microfilm camera onto roll microfilm and then this image is transferred by means of another photographic step onto a system storage element such as a film chip or film strip. Upon demand, the film chip is retrieved from the system and transported to an output station. The image on the chip is at the output station either projected by means of a lens system for direct viewing or projected into the input portion of a hard copy output machine. Other output means such as regeneration of roll microfilm or the provision of aperture card output is, of course, possible. It is well known that image degradation is proportionate to the number of lenses through which an image passes. Thus, ideally, an image storage and retrieval system would have no lenses. Obviously, this is impossible. However, to reduce the number of lenses in a system, most image storage and retrieval systems now, when reproduction of an image is to be accomplished at a 1:1 ratio, utilize contact printing techniques.

One of the prime problems encountered in contact printing techniques in an automated or semi-automated system is that of emulsion damage. The photographic emulsion normally used is relatively soft and prone to scratching. Thus, it is necessary that, when a contact printing step is to be effected, the members involved, which are coated with photographic emulsion, be brought into intimate contact without relative motion therebetween to prevent emulsion scratching. Additionally, since most of the image storage and retrieval systems in use or under development today are highly automated, the mechanism used in the contact printing operation must be susceptible to automatic control and have fairly high throughput rates. Finally, as in all automated equipment, the transport mechanism must be durable, highly reliable and simple in operation for maintenance purposes.

It is therefore an object of the present invention to provide a novel contact print transport system.

Another object of the present invention is to provide a highly reliable, durable, simple, inexpensive contact print transport system.

Another object off the present invention is to provide a transport mechanism for bringing into intimate contact at a work station members from remote picking stations which need not be equidistant from the work station.

Other and further objects and advantages of the invention will be apparent from the following more particular description of the preferred embodiment of the invention as illustrated in the accompanying drawings in which:

FIG. 1 is a partial isometric view of the transport mechanism with the two members which are to be brought into contact with each other near their home or picking station positions;

2

Briefly, to prevent scratching film emulsion during contact printing, the two films involved must be brought together with a normal motion between the contacting surfaces as distinguished from transverse relative motion. To accomplish this, there is provided a contact printing transport used to simultaneously access or pick, for instance, both a card and chip to be used in the printing operation. The transport, while travelling toward the card and chip involved in the contact printing operation during the first part of its motion, is guided by means of a common track. At a branching point the transport separates and the card picking section is guided by means of tracks to the card station while the chip picking portion of the transport is guided by means of other tracks to the chip picking station. The card and chip are then picked and the transport is moved toward the printing station. Prior to the arrival of the members carrying the chip and card at the branch point, they are locked together such that they come into contact at the branch point with a normal motion.

It should be understood that whereas in the following description the system will be described in a contact printing operation wherein information is printed from an aperture of an aperture card onto a film chip that the reverse could be true or that chip-to-chip copying could be provided with an obvious modification or that card-to-card copying could be provided.

Figure 1:
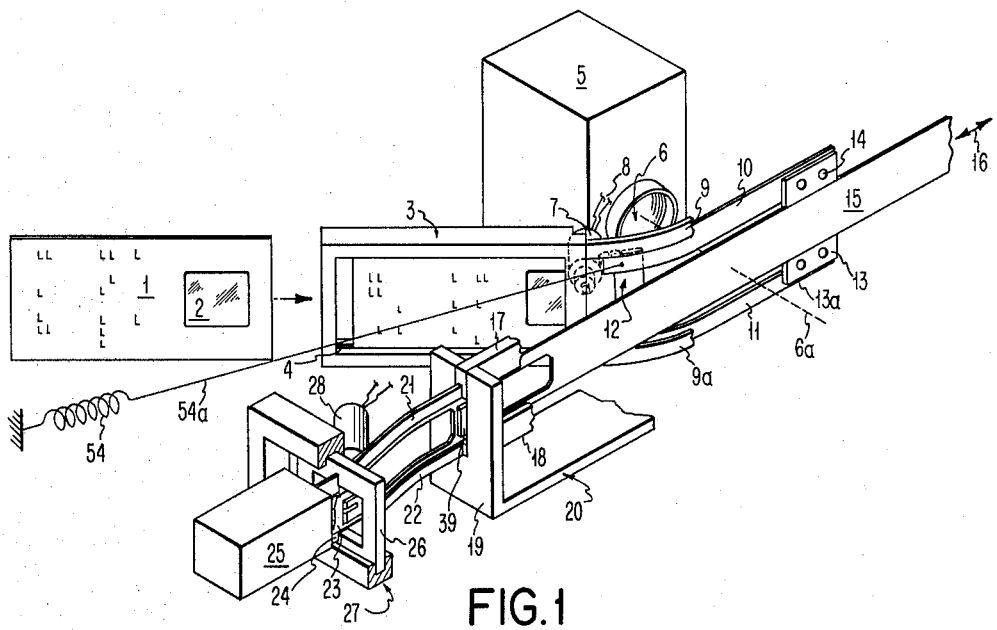

For a more detailed description, refer first to FIG. 1. In FIG. 1 is shown for illustrative purposes an aperture card 1 having an aperture 2 therein. The aperture card 1 is fed by conventional means (not shown) into a slotted card receptacle 3 containing slots 4 to hold the aperture card for the picking operation. Also shown in FIG. 1 for purposes of illustration, is a light housing 5 and a condensing lens 6 to be used in the contact printing operation. A card picker release solenoid 7 having leads 8 is connected to a suitable source (not shown). In alignment with the slots 4 of the slotted card receptacle 3 are card picker transport tracks 9 which guide the card picker transport arms 10 and 11 to which is connected, as will be more fully hereinafter described in conjunction with FIG. 4, a card picker designated generally at 12. Connected between the card picker transport arms 10 and 11 is a chip picker contact block 13 attached to the card picker transport arms 10 and 11 by means of screws or brads 14.

A steel tape 15 is propelled in the directions, as indicated by arrow 16, by suitable means (not shown). The steel tape 15 is slidably held by tape guides 17 and 18 which in turn are supported by the vertical extension 19 of frame member 20. Flexible terminal tape guides 21 and 22 are connected to and in alignment with the tape guides 17 and 18 for channeling the tape 15 and picker head 23 attached thereto, into alignment with a desired chip.

Figure 3:
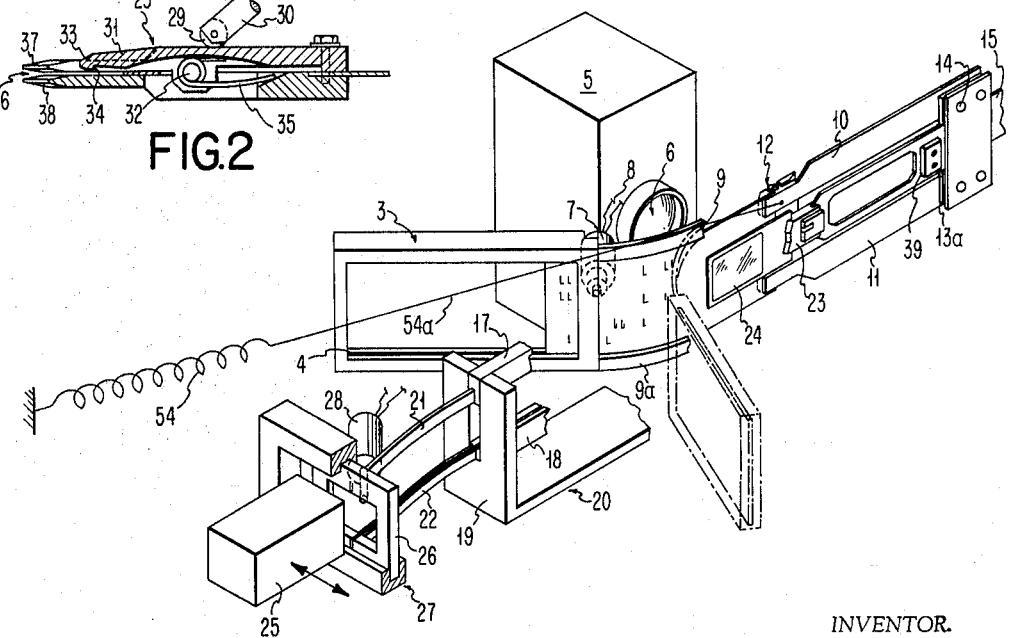
FIG. 3 is a partial isometric view similar to FIG. 1 illustrating that an additional member transporting channel can be added and further showing the members in contact with each other at the work or optical printing station.

In FIG. 1 a cell 25 is shown from which a chip 24 is being picked. As shown in FIGS. 1 and 3, the cell is, for instance, held rigid while the flexible tape guides 21 and 22 are moved by transverse movement of the support member 26 which is slidably held in the terminal frame member 27. The actual positioning of the support member 26 to align the picker 23 with the chips in the cell 25 is no part of the subject invention. This is merely one way that the selection of chips can be accomplished. As shown in FIGS. 1 and 3, a chip picker solenoid 28 is provided which is in operable association with the picker 23 to control picking and release of selected chips.

Connected to the card picker 12 is a bias means such as a spring 54 by means of cable 54a which biases the card picker 12 toward the slotted card receptacle.

Figure 2:
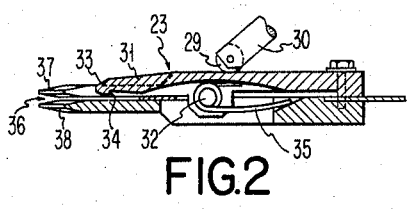
FIG. 2 is a sectional view of a film strip picking mechanism suitable for use in the subject system.

In FIG. 2 the picking mechanism 23 and its picking and releasing under control of the solenoid 28 is shown in detail. It will, however, be understood that any suitable sort of picking head and picking head actuator can be utilized in the subject invention. In FIG. 2 the picking mechanism 23 is shown with the solenoid 28 deenergized such that the armature contact roller 29 connected to the armature 30 is in contact with the picking finger 31 which pivots about shaft 32. Picking finger 31 includes at one extremity thereof a bevelled portion 33 and a film support ledge 34. The picking finger is biased by means of spring 35 such that the extremity including the bevelled portion 33 and film support ledge 34 are biased toward the film retaining slot 36 defined by the bevelled camming blades 37 and 38. Energization of the solenoid 28 which results in the removal of the armature contact roller 29 from the picking finger 31 allows the spring 35 to move the extremity of the picking finger 31 including the film support ledge 34 and the bevelled portion 33 into the film retaining slot 36. The chips 24 in cell 25 will, of course, be of such a width that they can be inserted in the film retaining slot 36 and will contain an opening into which the extremities 33–34 of the picking finger 31 can be inserted. A more complete description of this type of picking head, which is admirably suited for use in the subject system, is contained in U.S. Patent 3,175,855 entitled "Film Strip or Chip Picking Mechanism."

In operation, referring to FIGS. 1, 2 and 3, an aperture card 1 is inserted into the slotted card receptacle 3 with the aperture 2 to the right, as shown in the figures. The tape 15 is moved to cause the picker head 23 attached thereto, as described in conjunction with FIG. 2 under control of solenoid 28 to pick a chip 24 in alignment with the flexible tape guides 21 and 22. At the same time the card picker transport arms 10 and 11 move through the card picker transport tracks 9 and 9a to position the card picker 12 over the near extremity of the aperture card 1. The card picker solenoid 7 is then energized to cause the card picker head 12 to grasp the aperture card 1. This operation will be more fully described in connection with FIG. 4. When both the selected chip 24 and aperture card 1 have been grasped by their respective picking heads, the tape 15 is moved transporting the picker head 23 and chip 24 toward the optical axis of the lens 6. During the initial movement of the tape 15 and picker head 23 toward the optical axis 6a, the aperture card 1 remains in its initial or home position, as shown in FIG. 1, due to the bias action of spring 54. As the tape 15 moves toward the work station, the actuate block 39 will contact the face 13a of the chip picker contact block 13 and cause the card picker transport arms 10 and 11 and card picker 12 attached thereto to be locked relative to the tape 15 and move with the tape such that the chip 24 and aperture 2 of the aperture card 1 will come into alignment on the optical axis 6a of the lens 6 and be in intimate contact with each other. This latter or printing condition is illustrated in FIG. 3.

Figure 6:
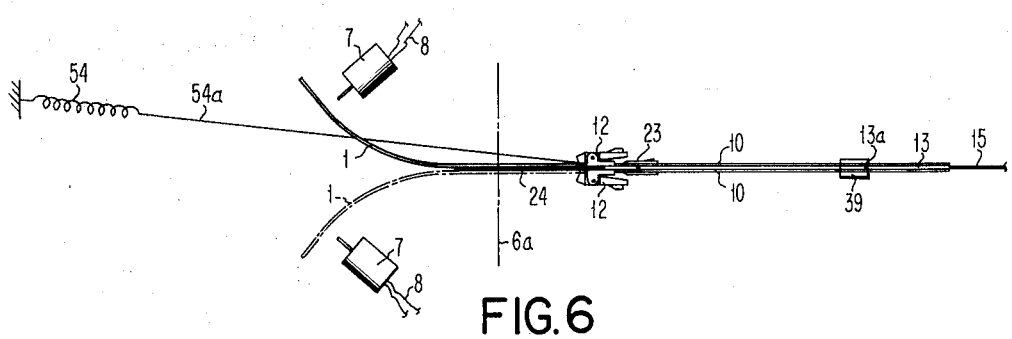
FIG. 6 is a top schematic view of the transport mechanism showing the members in alignment with and in contact at an optical printing station.

FIGS. 3 and 6 also illustrate that the chip picking head 23 is received within the opening 10a between the card picker transport arms 10 and 11 to effect intimate contact between the members held by the respective pickers.

Through utilization of this technique of having the tape 15 and actuate block 39 attached thereto contact the chip picker contact block 13 to cause the aperture card to be transported, the placement of the slotted card receptacle 3 and cell 25 need not be equidistant from the optical axis of the lens 6. If the two pickers were fixedly attached to each other, as is obvious, the receptacles containing the chips and cards would have to be equidistant from the optical axis.

Figure 4:
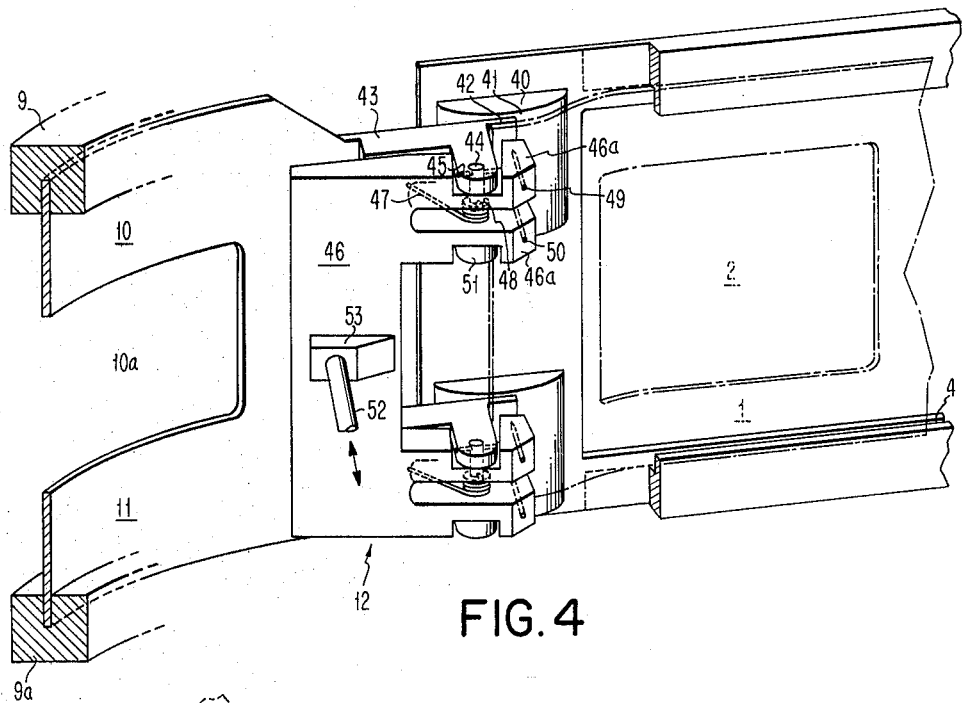
FIG. 4 is an isometric view of an aperture card picker which may be used when one of the members to be printed onto or printed from is an aperture card.

Refer next, for a more detailed description of the card picker, to FIG. 4. In FIG. 4, as shown, the card picker is in operable association with a card at the home position of the card in the slotted card receptacle 3. As shown in FIG. 4, the card 1 is guided over a card pick support 40 having a shoulder 41 therein into which the extension 42 of the card picker frame member 43 fits snugly such that when the card picker arrives at the card station, the extension 42 will go under the card, as shown in FIG. 4. The lower portion of the card picker functions exactly as the upper portion and therefore a description will be given only with respect to the upper portion of the card picker. A shaft 44 is fixed by means of a pin 45 therethrough to the card picker frame member 43. A pin support member 46 is rotatably mounted on shaft 44. A bias spring 47 is pinned to the shaft 44 through an opening 48 therethrough through which one extremity of the spring is inserted. Thus, the spring 47 biases the pin support member 46 by means of pressure on its rear side such that it is biased. Card pick pins 49 and 50 are contained in the extremities 46a of the pin support member 46. As shown in FIG. 4, the card pick pins 49 and 50 extend slightly beyond the face of the pin support member extremities 46a such that they can puncture the aperture card 1. A hub 51 is attached to shaft 44 for securing the pin support member 46 thereto.

In operation, it will be seen and appreciated that operation of the card picker release solenoid 7 causes the armature 52 to remove the foot 53 from contact with the pin support member 46 to thereby allow it to pivot in a counter-clockwise direction such that the aperture card 1 is punctured by the pins 49 and 50. The aperture card is then held by the pins 49 and 50 between the pin support member extremities 46a and the card picker frame extremity 42 for transport to the optical station. Upon return of the card, the opposite sequence takes place such that the solenoid 7 is operated to cause the foot 53 to bear on the pin support member 46 against the bias action of spring 47 to remove the pins 49 and 50 from the aperture card 1 and thereby release it.

It will, of course, be recognized by those skilled in the art that the pins 49 and 50 could be replaced by friction jaws without departing from the spirit and scope of the invention.

Figure 5:
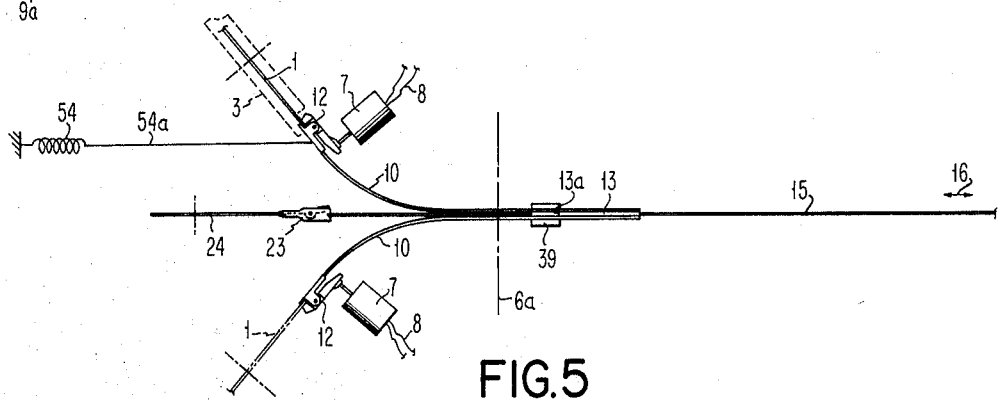
FIG. 5 is a top schematic view illustrating the transport path of the system with the members to be transported into relative contact with each other shown at their home positions.

FIGS. 5 and 6 are schematic representations from a top view showing the relative placement and movement of the aperture card and chip. Thus, as illustrated in FIGS. 5 and 6, two aperture cards can be selected from remote locations and brought into contact for contact printing or an aperture card and a chip may be brought together for contact printing either from the card to the chip or from the chip to the card. It should be noted that the schematic views of FIG. 5 and FIG. 6 show the spring bias by means of spring 54 attached to the card pickers 12 to cause them to be biased toward the slotted card receptacle 3. As shown, only one spring is provided since the card pickers 12 are connected. As shown in FIGS. 1 and 3, the tape 15 functions to propel or carry the card pick fingers 12 by means of the pressure of the actuate block 39 on the chip picker contact block 13 to cause the card pickers 12 and card held therein to move to the right into alignment with the optical axis 6a of the lens 6. However, the return action of the card pickers into the slotted card receptacles for picking or release of a card is provided by means of the bias spring 54 as shown in FIGS. 5 and 6.

In summary, to prevent scratching film emulsion during contact printing, the two films involved must be brought together with a normal motion between the contacting surfaces as distinguished from transverse relative motion. To accomplish this, there is provided a contact printing transport used to simultaneously access or pick, for instance, both a card and chip to be used in the printing operation. The transport, while travelling toward the card and chip involved in the contact printing operation during the first part of its motion, is guided by means of a common track. At a branch point the transport separates and the card picking section is guided by means of tracks to the card station while the chip picking portion of the transport is guided by means of other tracks to the chip picking station. The card and chip are then picked and the transport is moved toward the printing station with the chip and card coming into contact with each other at the branch point without relative motion.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. A transport mechanism for transporting two members from separate picking stations, which may be located at different distances from a work station into alignment and contact at the work station without relative movement between the members during contact, comprising:
    two picker heads capable of picking said two members,
    first guide means for guiding one of said picker heads between one of said picking stations and said work station,
    second guide means for guiding the other of said picker heads between said other picking station and said work station, and
    means for moving said picker heads in said first and second guide means between said picking stations and said work station including motive means operable initially on said picker which picks the member most remote from said work station to cause it to move toward said work station and then when said pickers are equidistant from said work station operable on both of said pickers to move them simultaneously to said work station.

2. A transport mechanism for transporting two members from separate picking stations, which may be located at different distances from a work station into alignment and contact at the work station without relative movement between the members during contact, comprising:
    two picker heads capable of picking said two members,
    first guide means for guiding one of said picker heads between one of said picking stations and said work station,
    second guide means for guiding the other of said picker heads between said other picking station and said work station,
    said first and second guide means branching together at a branching point to provide a common guide path adjacent said working station, and
    means for moving said picker heads in said first and second guide means between said picking stations and said work station including motive means operable initially on said picker which picks the member most remote from said work station to cause it to move toward said work station and then when said pickers are adjacent said branching point operable on both of said pickers to move them simultaneously to said work station along said common guide path.

3. A transport mechanism for transporting two members from separate picking stations, which may be located at different distances from a work station into alignment and contact at the work station without relative movement between the members during contact, comprising:
    two picker heads capable of picking said two members,
    first guide means for guiding one of said picker heads between one of said picking stations and said work station,
    second guide means for guiding the other of said picker heads between said other picking station and said work station,
    said first and second guide means branching together at a branching point to provide a common guide path adjacent said working station,
    motive means operable initially on said picker which picks the member most remote from said work station to cause it to move toward said work station to said branching point, and then operable on both of said pickers to move them simultaneously to said work station, and
    means for locking said picker heads together for transport to said work station.

References Cited by the Examiner
UNITED STATES PATENTS

| | | | |
|---|---|---|---|
| 1,108,876 | 9/1914 | Alemany | 156—572 X |
| 2,505,925 | 5/1950 | Von Haase | 270—58 |
| 2,809,031 | 10/1957 | Alexander | 270—58 |

MARVIN A. CHAMPION, *Primary Examiner.*